Feb. 15, 1938.   J. D. MORGAN   2,108,778
ELECTRIC TOASTER
Filed Sept. 17, 1936
Fig. 1.
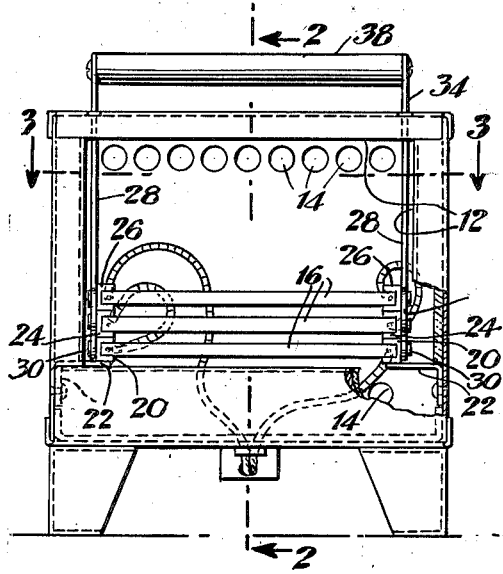
Fig. 2.
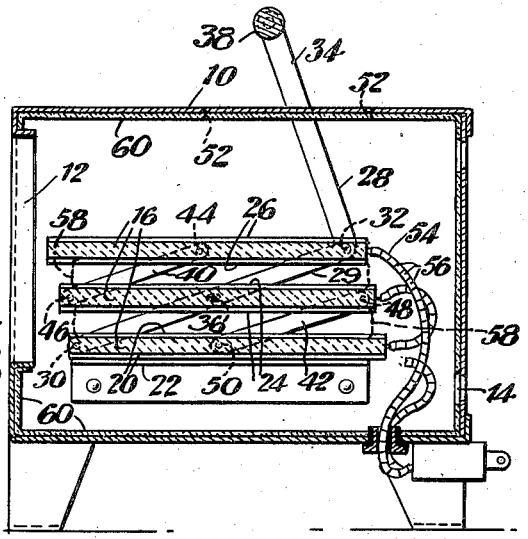
Fig. 3.
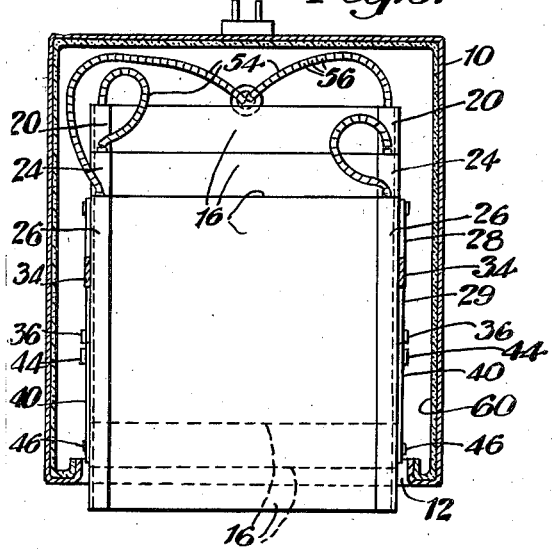
Fig. 4.
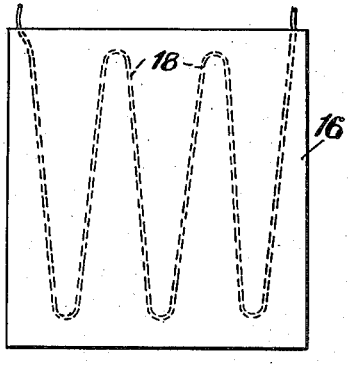
Fig. 5.
INVENTOR
JOHN D. MORGAN
BY Edmund G Borden
ATTORNEY Patented Feb. 15, 1938

2,108,778

UNITED STATES PATENT OFFICE 2,108,778

ELECTRIC TOASTER

John D. Morgan, South Orange, N. J., assignor to Power Patents Company, Hillside, N. J., a corporation of Maine Application September 17, 1936, Serial No. 101,237

3 Claims. (Cl. 219—19)

This invention relates to electric toasters for toasting bread and the like. A primary object of the invention is to provide an electric toaster which is adapted for rapidly and efficiently toasting slices of bread, sandwiches and the like.

One feature of the invention is that of having at least two toasting elements which are in simultaneous direct contact with both sides of a slice of bread or sandwich being toasted, said elements comprising ceramic hot plates with resistor heating elements embedded therein. A plurality of toasting elements are preferably embodied in the unit and such elements are movable relative to each other so as to permit the toasting of slices of bread and sandwiches of variable thickness. The toasting elements are preferably mounted in vertically spaced horizontal planes on supporting members which are relatively movable by gravity action toward each other during the toasting operation so as to impress the weight of the hot plates and supporting members on slices of toast inserted between the elements, thereby adapting the toaster to the production of compressed toast or wafer thin melba toast.

With the above and other objects and features in view the invention comprises the electric toaster which is hereinafter described and more definitely defined by the accompanying claims.

In the following description reference will be made to the accompanying drawing, in which:

Fig 1 is a view in front elevation, with parts cut away, illustrating the principal features of the preferred design of the toaster which forms the subject of the present invention, with the hot plates in closely spaced non-toasting relation;

Fig. 2 is a view in vertical side section taken on the lines 2—2 of Fig. 1, showing the hot plates in spaced toasting relation;

Fig. 3 is a view in horizontal section taken on the line 3—3 of Fig. 1, showing the hot plates in widely spaced sandwich toasting relation;

Fig. 4 is a plan view of one of the ceramic hot plates, showing in dotted lines the embedded resistor wire heating element; and Fig. 5 is a view in vertical elevation of an end of the hot plate shown in Fig. 4.

Referring to the accompanying drawing, and particularly to Fig. 1, it will be noted that the electric toaster which forms the subject of the present invention is preferably provided with a metal box housing 10 having a large opening 12 in its front wall through which slices of bread and sandwiches may be inserted and toast removed. In the rear wall of the housing 10 apertures 14 are provided which permit circulation of air through the housing. The toasting elements of the toaster illustrated comprise three ceramic hot plates 16 mounted within the housing 12 in horizontal superimposed relation. Each of the hot plates 16 comprises a ceramic plate of suitable size for toasting a slice of bread, the preferred material for the plate comprising about 40–50 parts by weight of milled grain zircon and 60–50 parts of finely ground ferrosilicon bonded with about 6% of phosphoric acid. Within each plate there is embedded a metal wire or ribbon electric resistor 18.

The two side edges of the lower plate 16 are supported by parallel channel members 20 which are in turn clamped to brackets 22 mounted along the lower side walls of housing 10. The central hot plate is supported by a pair of lateral channels 24, and the upper hot plate is supported by a pair of lateral channels 26. Each of the two upper hot plates is movably mounted relative to the bottom hot plate on a parallel motion guide frame, the principal elements of which comprise two L-shaped levers 28 (see Fig. 2) each having a depending leg 29. Each leg 29 has its lower end pivotally connected to the outside of one of the two channels 20 at the front end thereof by a pin 30, and its upper end pivotally connected to the outside of one of the two channels 26 at its rearward end by a pin 32. Likewise the lower leg 29 of each of the L-shaped levers 28 is pivotally connected at about its midportion with the outside of each of the channels 24 at about the midsection of the channel, by a pin 36. An upper leg 34 of each lever 28 is connected at its upper end to the other lever by means of a handle 38. The parallel motion guide frame also includes two pairs of spacing links 40 and 42 (Fig. 2), links 40 being pivotally connected respectively by pins 44 and 46 to the central portions of channels 26 and to the front ends of channels 24, while each of the links 42 is pivotally connected to the rearward end of channels 24 and to the central portion of channels 20 respectively by pins 48 and 50. Slots 52, outlined by dotted lines in Fig. 2 are cut in the top wall of housing 10 in the vertical planes in which the upper legs 34 of each lever 28 reciprocate, so as to permit reciprocation of the levers without interference by the casing.

Current for heating the hot plates 16 is delivered to the resistors 18 from an outside source through flexible conductors 54. Conductors 54 are mounted as illustrated so as to connect the resistors in the plates 16 in series, and so as to supply electric current to the hot plates when the plates are in their normally closely spaced relation as shown in Fig. 1, as well as when they are in a widely spaced relation while toasting as illustrated in Fig. 2. The conductors 54 are insulated by means of a plurality of short tubular ceramic beads 56 which are threaded on the wires.

The operation of the toaster will not be difficult to understand. When it is desired to toast slices of bread or sandwiches the toaster may be first plugged into an electric circuit while in its normally non-operating position as illustrated in Fig. 1. By moving the handle 38 forward toward the left as view in Fig. 2, the plates 16 can be separated a sufficient distance apart to allow insertion of either slices of bread or sandwiches between the upper and middle plates and also between the middle and lower plates. On releasing the handle 38 the upper arms of the levers 28 swing back toward the right, the weight of the upper plates 16 and of the supporting elements and guide frame thereby compressing the slices of bread which are to be toasted (indicated by dotted lines 58 in Fig. 2), such pressure being continuously applied to the slices of bread throughout the toasting operation. Each flat surface of each slice of bread is in intimate contact with the heating surfaces of the plates 16 so that each slice of bread is toasted at a uniform rate on both sides simultaneously. Likewise the thickness of each slice of bread is reduced to about half or less than half its original thickness during the toasting period by reason of the pressure to which each slice is subjected during toasting. Additional slices of bread can be toasted on one side by insertion above the upper plate and below the lower plate. By removing the crust from slices of bread and inserting them between the plates, such bread can be toasted to almost wafer thinness during the toasting operation, thereby producing a product known as melba toast. Sandwiches can be toasted by separating the plates 16 over approximately twice the vertical spacing indicated in Fig. 2, so as to provide room for inserting the sandwiches between the plates. As the plates are separated the upper plates also move forwardly as indicated in Fig. 2, by reason of the fact that the pins 36 and 32 swing in an arc around the fixed pivotal pins 30.

The surfaces of the plates 16 are glazed and can be readily cleaned between toasting operations, thereby insuring efficient toasting without sticking. It will be readily appreciated that thermostatic control and extrusion apparatus for removing the toasted bread can be added if desired. In order to conserve heat the box closure 10 is preferably lined with asbestos or other suitable insulating lining 60.

The invention having been thus described, what is claimed as new is:

1. In an electric toaster, a plurality of ceramic hot plates mounted in parallel spaced relation on a supporting frame having relatively movable plate supporting elements, each hot plate comprising a metal resistor filament embedded in a ceramic plate having an integral smooth ceramic heating surface, each of said plates composed essentially of a mixture of about 40 to 50 parts of zircon, 60 to 50 parts of finely ground ferrosilicon bonded with about 6% of phosphoric acid, parallel motion connecting links and guide members for the movable elements of the frame whereby the spacing between the hot plates can be varied to accommodate slices of bread and sandwiches, and conductors connecting the resistor filaments in series with a source of electric current.

2. In an electric toaster, a plurality of ceramic hot plates having smooth ceramic heating surfaces integral with the ceramic material of said plates mounted in superimposed relation in vertically spaced horizontal planes, each of said plates composed essentially of a mixture of about 40 to 50 parts of zircon, 60 to 50 parts of finely ground ferrosilicon bonded with about 6% of phosphoric acid, a supporting frame for said hot plates having relatively movable supporting elements and parallel motion connecting links and guide members whereby the vertical spacing between the plates may be varied to accommodate slices of bread and sandwiches, said frame and parallel motion guide links being pivotally connected to a stationary support for the lower plate in such a way as to allow the weight of the upper plates and supporting frame to compress slices of bread inserted between the plates during the period in which the bread is being toasted.

3. In an electric toaster, a plurality of ceramic hot plates mounted in spaced parallel planes on a frame including a rigidly mounted pair of side rail supports for one plate and sets of side rail supports for each of the other plates which are movably mounted relative to the mounting for the first named plate, a parallel motion guide link mechanism for the side rails including a pair of levers each pivotally connected at one end to the side rail supports for the stationary plate and at the other end to the side rail supports for another plate and intermediate its ends to the midportion of the side rail supports for a centrally positioned plate, and two pairs of spacing links pivotally connecting the ends of the side rails for the intermediate plate respectively with the midportions of the side rails supporting the two end plates.

JOHN D. MORGAN.